July 9, 1968 L. E. SCHWARTZ 3,392,315

TAPE REPRODUCER INCLUDING PROGRAMMED MOTOR STOPPING AT VARIOUS POSITIONS BY CONDUCTIVE STRIPS ON TAPE AND MANUAL RESTART

Filed Oct. 16, 1964

INVENTOR.
LOUIS E. SCHWARTZ
BY Albert T. Kronman
ATTORNEY

United States Patent Office 3,392,315
Patented July 9, 1968

3,392,315

TAPE REPRODUCER INCLUDING PROGRAMMED MOTOR STOPPING AT VARIOUS POSITIONS BY CONDUCTIVE STRIPS ON TAPE AND MANUAL RESTART

Louis E. Schwartz, % New York Law School, 57 Worth St., New York, N.Y. 10013

Filed Oct. 16, 1964, Ser. No. 404,300
4 Claims. (Cl. 318—162)

ABSTRACT OF THE DISCLOSURE

A tape reproducer is described having a continuous magnetic tape run by an electric motor. A means for stopping the tape at predetermined tape positions includes a removable conductive strip attached to the tape. A means for starting the tape again includes a control switch and a mechanical interlock, operated by two relay windings. The method of operation includes running the tape without interruption while a question is asked or an argument is presented. After the tape is stopped, and the question has been discussed, the tape may be started again only by closing a control switch to change the interlock and start the motor.

This invention relates to a control means for stopping a continuous magnetic tape within a cartridge as the tape is moved through a reproducing means. The invention has particular relationship to the circuit means coupled between a conductive portion of the tape, the tape motor, and a manual reset button which starts the tape after it has been stopped.

Nearly all tape reproducers are equipped with a motor switch which can be used to start and stop the tape as it is moved through a reproducing head. The present invention differs from such an arrangement by employing a conductive film or strip applied to specific points on the tape for stopping it without manual control. The automatic stopping feature may serve in a self-teaching educational program which comprises the use of the presentation by a succession of pupils. After the taped program has been started it cannot be stopped until it reaches the automatic shut off. Thereafter the tape may be started again by a manual reset switch. While this invention is directed to an educational program, it is obvious that it can be used in many other applications.

An object of the present invention is to provide an improved tape control means which avoids one or more of the disadvantages and limitations of prior art arrangements.

Another object of the present invention is to stop a tape in a sound reproducing device in accordance with a predetermined program of operations.

A further object of the present invention is to start the stopped tape by manual means after a desired time interval.

A still further object of the present invention is to provide an educational device for presentation of a program which will start and stop at the desired place each time it is used.

Another object of the present invention is to provide an inter-locking circuit control means which prevents stopping the tape at any position other than the predetermined stop points.

A feature of the present invention includes the use of a conducting film which may be applied to the recording tape at any desired position.

Another feature of the present invention includes the use of a double winding relay assembly with two inter-locking armatures. This device retains the tape in its stopped condition even when the tape switch is opened.

The invention comprises a control circuit added to a continuous tape reproducing system. This circuit includes two conductive terminals secured to the tape storage cartridge and a conductive film strip secured to the tape for contact with the terminals. The circuit also includes a double winding relay assembly which opens a pair of contacts in series with the motor when the film strip makes contact with the terminals. A manually operable reset switch is connected to one of the relay windings to unlock a portion of the armature assembly and start the motor.

The invention consists of the construction, combination and arrangement of parts, as herein illustrated, described and claimed.

In the accompanying drawings, forming a part hereof, there is illustrated one form of embodiment of the invention, in which drawings similar reference characters designate corresponding parts, and in which.

Figure 1:
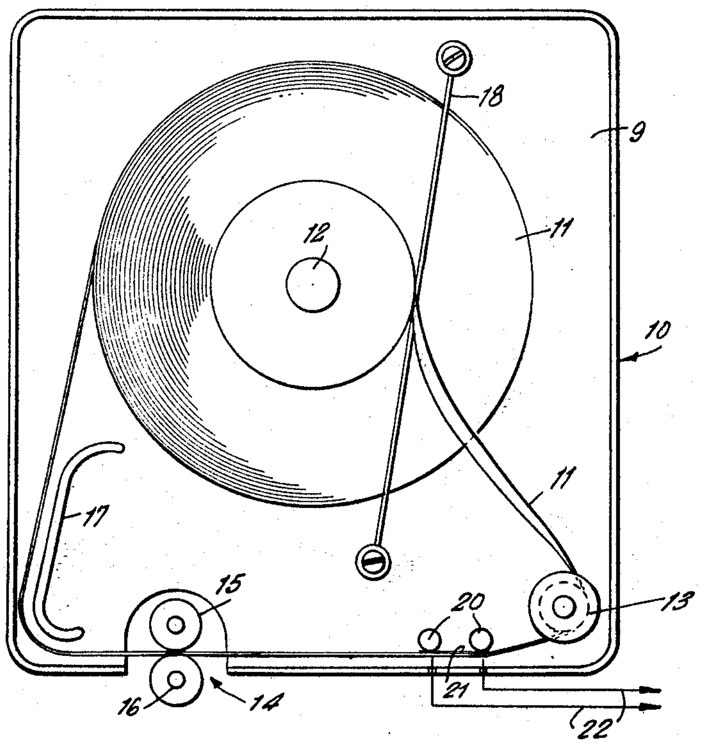
FIGURE 1 is a top plan view of a tape cartridge which supports the tape coil, directs the tape through a reproducing head, and rewinds the tape.
Figure 2:
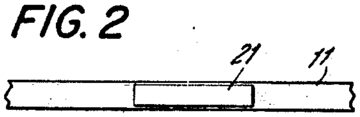
FIGURE 2 is a plan view of a portion of the tape covered by a conductive film.

Referring now to FIGURES 1 and 2, a coil supporting structure 10 includes a cartridge housing 9, which supports a coil of magnetic tape 11, and a hub 12 for maintaining the wound tape in its central position. A tape guide roller 13 is provided at one corner of the structure for directing the tape toward a reproducing head 14, as the tape leaves the supply coil. The reproducing device 14 may take several forms. The one shown in FIGURE 1 includes a driving wheel 15 and a reproducing means 16. After the tape has passed through the reproducing means it is again directed toward the periphery of the coil 11 by several guiding means, one of which is shown as a barrier 17. When the tape is unwound, it is removed from the central portion of the coil and passes over a wire 18, the ends of which are secured to the cartridge housing 9.

In order to stop the tape at a predetermined position, two conductive terminals 20 are secured to the cartridge housing 9. These terminals which may be in the form of metal posts are normally not in electrical contact and are insulated from each other by the housing 9. When the conductive film 21 shown in detail in FIGURE 2 bridges the terminals 20 they are short circuited. Terminals 20 are connected to conductors 22 which in turn are connected to the circuit means shown in FIGURE 3. The tape support 10 contains a single continuous coil of tape 11, and is unwound and wound at the same time so that it requires no rethreading or other manual manipulation. The present invention is particularly adapted to tape structures, such as those which have a continuous tape within a cartridge. Such a device requires no rethreading or rewinding but requires that it be stopped and started at the proper points in the presentation.

Figure 3:
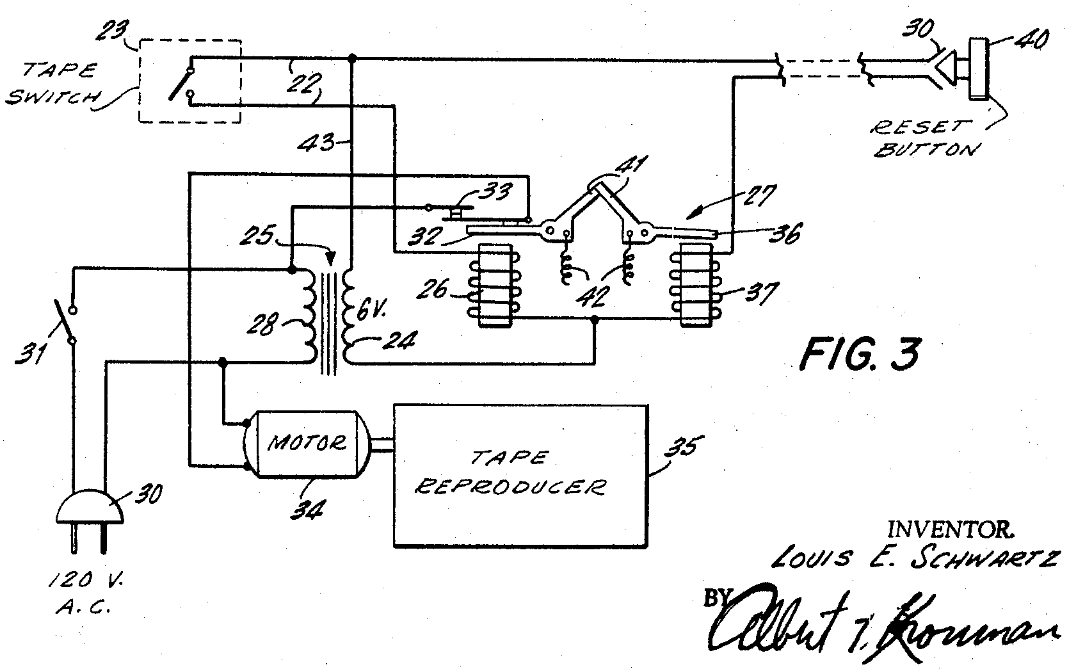
FIGURE 3 is a schematic diagram of connections showing the tape reproducer in block.

Referring now to FIGURE 3, the tape switch is shown within dotted lines 23, this switch being the equivalent of terminals 20 and the conductive foil 21. This switch is connected in series between the secondary winding 24 of a transformer 25 and the winding 26 of one portion of a duplex relay arrangement 27. The primary winding 28 of the transformer is connected directly to a plug 30 in series with a main switch 31. The plug is for connection to the usual alternating current supply. Relay winding 26 is magnetically coupled to an armature 32 on which are mounted a pair of normally closed contacts 33. Contacts 33 are connected in series between the supply line and a motor 34 which drives the tape reproducer 35 and the tape coil 11.

Armature 32 is mechanically coupled to a second armature 36 which is operated by a second winding 37 connected in series with the contacts 38 of a manual reset switch 40. This switch is connected to the tape switch 23, controlled by the conductive foil 21, when it short circuits terminals 20. Each of the armatures 32 and 36 contains a blocking end portion 41 and each of the armatures is resiliently urged by springs 42 to return to their normal positions.

The operation of this circuit is as follows: the plug 30 is connected to a source of supply and when the tape is first started, switch 31 is closed. This circuit applies a voltage through contacts 33 to motor 34 and the tape reproducer 35 is actuated and reproduces the sound which has been prerecorded. The tape moves through the reproducing device 15–16, and produces a recorded message in the usual manner. After a preliminary set of instructions or a series of questions, a portion of the tape 11, having a conductive film 21, applied to its inner surface makes contact between conductive terminals 20 and a circuit is thereby completed which may be traced from one side of winding 24, over conductor 43, through the tape switch 23, then through winding 26, and back to the other side of winding 24. This circuit actuates one-half of the relay assembly and attracts armature 32, opening contacts 33 to stop the motor and moving one of the barriers 41 out of the way of the end of armature 32. This action locks the armature 32 in its actuated position and the armature will stay in that position, maintaining contacts 33 open, until armature 36 is actuated.

With the motor stopped and the tape reproducer inactive, the answer period or the discussion period may proceed until all points brought up in the previous tape reproduction have been decided or answered or until a restarting of the tape is desired. At the end of this period, the instructor, or someone else in control, depresses switch button 40 connecting contacts 38 and thereby completes a circuit which may be traced through winding 37, contacts 38, and back to winding 24. This action actuates relay armature 36 and unlocks armature 32 which is pulled back into its normal position by one of the springs 42. Contacts 33 are now closed and the motor 34 again operates the tape reproducer 35.

During the playing of the program the tape cannot be stopped by the pupil. Alternately, several programs may be placed on a single reel. The invention is not limited to the number of conductive film strips which may be applied to the tape. These conductive strips may be small pieces of aluminum foil cemented to the inner surface of the tape.

From the above description and operation, it will be apparent that the tape may be stopped only by a conductive strip of film on the tape and that the tape may be restarted only by the actuation of the reset button switch 40. It is not possible for a student to let the tape run far or stop the program before its end thereby confusing the next person who wishes to listen to the recording.

Having thus fully described the invention, what is claimed as new and desired to be secured by Letters Patent of the United States is:

1. A tape reproducer including a magnetic tape, an electric motor for moving the tape through a reproducing means, and a tape structure which supports the tape while it is being stored and moved through the reproducing means, the improvement which comprises:

(a) two conductive terminals secured to the structure, insulated from each other and arranged to make contact with the tape;

(b) a conductive film strip applied to the tape for making electrical contact with said terminals;

(c) circuit means connected between the terminals and the motor for disconnecting the motor from its source of power when the terminals are connected to each other by the conductive film;

(d) said circuit means including in series connection, a source of potential, said terminals, and a first relay winding;

(e) a double relay combination including said first relay winding, a first relay armature operating a pair of contacts in series with the motor, a second relay winding, and a second relay armature, said first and second armatures arranged in locking position whereby either normalized armature locks the other armature in its operated position;

(f) and a reset circuit for starting the motor after it has been disconnected, said circuit including a manual reset switch, said source of potential, and the second relay winding, all connected in series.

2. A tape reproducer as claimed in claim 1 wherein said first and second armatures are resiliently stressed to move to a normal position and wherein each armature is formed with an inter-locking extension, said extensions adapted to prevent the condition of both armatures being in their normal positions.

3. A tape reproducer as claimed in claim 1 wherein said conductive film strip is a sheet of metal foil and is removably secured to the tape by pressure sensitive adhesive.

4. A tape reproducer as claimed in claim 1 wherein said conductive terminals are metal posts secured to an insulator base.

References Cited

UNITED STATES PATENTS

| | | | |
|---|---|---|---|
| 2,693,127 | 11/1954 | Ortman | 318—162 X |
| 2,834,928 | 5/1958 | Carter | 318—162 |

ORIS L. RADER, *Primary Examiner.*

T. E. LYNCH, *Assistant Examiner.*